(12) United States Patent
Galtz

(10) Patent No.: US 6,932,151 B2
(45) Date of Patent: Aug. 23, 2005

(54) HEAT EXCHANGER OF AN AUXILIARY HEATER

(75) Inventor: Rüediger Galtz, Graefelfing (DE)

(73) Assignee: Webasto Thermosysteme International GmbH, Stockdorf (DE)

( * ) Notice: Subject to any disclaimer, the term of this patent is extended or adjusted under 35 U.S.C. 154(b) by 12 days.

(21) Appl. No.: 10/234,720

(22) Filed: Sep. 5, 2002

(65) Prior Publication Data

US 2003/0085028 A1 May 8, 2003

(30) Foreign Application Priority Data

Sep. 5, 2001 (DE) .......................................... 101 43 458

(51) Int. Cl.[7] .............................. F28D 7/12; B60H 1/02
(52) U.S. Cl. ...................... 165/58; 165/142; 165/901; 237/12.3 C
(58) Field of Search .............................. 165/41, 42, 58, 165/51, 142, 901; 237/12.3 R, 12.3 B, 12.3 C; 236/96; 431/351, 62, 63; 126/110 B, 110 D, 110 R

(56) References Cited

U.S. PATENT DOCUMENTS

| | | | |
|---|---|---|---|
| 3,593,783 A | 7/1971 | Muller | |
| 4,543,943 A | 10/1985 | Gruber et al. | |
| 4,590,888 A | 5/1986 | Mosig | |
| 4,640,262 A | 2/1987 | Lucius | |
| 4,905,895 A | 3/1990 | Grebe et al. | |
| 5,018,490 A | 5/1991 | Kroner | |
| 6,089,465 A | 7/2000 | Habijanec et al. | |

FOREIGN PATENT DOCUMENTS

| | | | |
|---|---|---|---|
| DE | 1 454 672 | | 5/1969 |
| DE | 1 800 561 | | 5/1970 |
| DE | 196 39 106 C2 | | 3/1998 |
| DE | 197 49 809 A1 | | 5/1999 |
| DE | 199 34 488 A1 | | 2/2001 |
| EP | WO 95/18023 | * | 7/1995 |
| GB | 2 227 556 A | * | 8/1990 |
| JP | 63-131990 | * | 6/1988 |
| JP | 5-24430 | * | 2/1993 |

* cited by examiner

Primary Examiner—Ljiljana Ciric
(74) Attorney, Agent, or Firm—Nixon Peabody LLP; David S. Safran

(57) ABSTRACT

An auxiliary heater suitable for mobile applications and provided with a burner and a cup-shaped heat exchanger (10) which has a hollow cylindrical wall section (26, 48) with a first end area (16) facing the burner, a bottom section (24, 46) facing away from the burner, a heat transfer medium inlet (18), and a heat transfer medium outlet (20), by which, in operation of the auxiliary heater, a fluid heat transfer medium flows through the bottom section (24, 46) and the hollow cylindrical wall section (26, 48). In order to devise an auxiliary heater with has higher efficiency than known auxiliary heaters of the same size, both the heat transfer medium inlet (18) and heat transfer medium outlet (20) located on the first end area (16) of the heat exchanger (10).

16 Claims, 2 Drawing Sheets

HEAT EXCHANGER OF AN AUXILIARY HEATER

BACKGROUND OF THE INVENTION

1. Field of the Invention

The invention relates to the heat exchanger of an auxiliary heater for mobile applications, which is formed in a cup shape and has a hollow cylindrical wall section with a first end area facing the burner of the auxiliary heater, a bottom section facing away from the burner, a heat transfer medium inlet, and a heat transfer medium outlet located on the first end area, by which in operation of the auxiliary heater a fluid heat transfer medium flows through the bottom section and the hollow cylindrical wall section. Furthermore, the invention relates to an auxiliary heater with one such cup-shaped heat exchanger.

2. Description of Related Art

Auxiliary heaters for mobile applications in which a fluid heat transfer medium is used to transfer the generated heat energy are installed, for example, as auxiliary water heaters in vehicles, such as passenger cars, trucks, busses, railway cars or ships. They are generally used to heat the passenger compartment or to preheat the cooling water of the internal combustion engine of the vehicle.

A characteristic feature of an auxiliary heater with a fluid heat transfer medium is that the heat exchanger on the burner of the auxiliary heater does not heat a gas, such as the air of the passenger compartment, but a fluid, especially a liquid. This liquid can be, for example, the liquid coolant of an internal combustion engine which is preheated by the auxiliary heater. However, the fluid can also be used, with the aid of another heat exchanger, for subsequent heating of the air of the passenger compartment. Therefore, the auxiliary heaters relevant here are often used as combination devices with which both the liquid coolant of an internal combustion engine and the air in the passenger compartment are heated.

These auxiliary heaters are known (see, for example, published German Patent Applications DE 197 49 809 A1, and DE 199 34 488 A1, and U.S. Pat. Nos. 4,543,943; 4,590,888; 4,640,262; and 6,089,465). They each have a burner which is generally provided with a fire tube. In the fire tube, a flame burns in operation of the burner; its exhaust gas is used to heat the indicated fluid. To do so, the fire tube is surrounded by a cup-shaped heat exchanger which is double-walled and by which fluid is conveyed as the heat transfer medium using a circulation pump. For this purpose, in the area of the bottom section of the cup-shaped heat exchanger, a heat transfer medium inlet is provided, and in the end area of the hollow cylindrical wall section facing the burner, a heat transfer medium outlet is formed.

Therefore, the heat transfer medium flows through the known heat exchangers proceeding from the bottom section of the heat exchanger in the direction toward the end area facing the burner. This type of flow ensures comparatively good and uniform heat transfer from the exhaust gas to the heat transfer medium. So that the heat transfer medium can enter in a streamlined flow at the bottom section, known heat exchangers have a sloping bottom section. However, due to the slope of the bottom section, the heat-transferring surface on the bottom section on the flue gas side is reduced by roughly the inside diameter of the heat transfer medium inlet. This leads to reduced heat transfer, and thus, to a higher exhaust gas temperature and poorer efficiency of the heat exchanger. In addition, when the heat transfer medium enters the bottom section radially or tangentially, it is deflected into the axial extension or route of the hollow-cylindrical wall section, so that backflow and dead water areas form which promote bubbles, especially steam bubbles, and cavitation.

German Patent 1 800 561 discloses a hollow cylindrical heat exchanger with hollow cylindrical heat exchanger elements located concentrically in one another. The basic version of heat exchanger does not have a heat-transferring bottom section so that its efficiency is comparatively small compared to its size. In order to implement a heat-transferring bottom section, a single heat exchanger element must be provided there, with a separate heat transfer medium inlet and outlet. The provided heat exchanger elements located concentrically in one another, likewise, require a respective heat transfer medium inlet and outlet. In addition, the flow of heat transfer medium is deflected in narrow arcs; this likewise leads to the aforementioned problems with backflow and dead water areas.

SUMMARY OF THE INVENTION

The primary object of the invention is to provide a heat exchanger of the initially mentioned type for an auxiliary heater which enables higher efficiency for auxiliary heaters of the same size.

This object is achieved as in accordance with the invention by the heat transfer medium inlet of the heat exchanger being located on a first end area of a hollow cylindrical wall section.

According to the invention, the heat transfer medium inlet is shifted into the end area of the heat exchanger which is near the burner, where relatively little heat is generated by the flame of the burner and delivered to the heat exchanger. The heat transfer medium inlet arranged in accordance with the invention, therefore, does not reduce the size of the flue gas-side heat exchanger surface. The heat transfer medium delivered according to the invention flows through the heat exchanger almost free of backflow and dead water. Moreover, since bubble formation and cavitation are avoided, with the invention, the heat transfer medium, overall, has a comparatively higher efficiency than is the case in conventional heat exchangers.

Furthermore, in accordance with the invention, an especially compact and space-saving arrangement of the heat transfer medium inlet and heat transfer medium outlet is formed on only one end area of the heat exchanger. Therefore, connections for the inlet and outlet can be made, for example, with an individual connection piece or connection flange which is simple to mount and dismount. Overall, in assemblies in vehicle construction, efforts are made to provide few interfaces with which individual contact must be made. The arrangement of the heat exchanger outlet of the invention achieves this for the auxiliary heater.

Here, the arrangement in accordance with the invention is in clear contrast to existing heat transfer medium inlets located on the bottom section of the heat exchanger and the known "unidirectional" flow of fluid heat transfer medium through the heat exchanger.

According to the invention, the heat transfer medium flows through in a completely different manner which, moreover, can be used especially to advantage in a corresponding development.

In one advantageous development of the invention, the heat exchanger has an exhaust gas outlet which is, likewise, located on the burner end area of the heat exchanger. This arrangement of the exhaust gas outlet is also present in known heat exchangers of auxiliary heaters, but it is anything but self-evident to so locate the exhaust gas outlet in the heat exchanger made in accordance with the invention. Because the heat transfer medium flows through the heat exchanger of the invention differently than through known heat exchangers, first of all, it can be assumed that exhaust gas or fuel gas routing must be adapted accordingly in the heat exchanger. However, it has been ascertained that, with respect to the connection of the exhaust gas outlet, it is advantageous if it is located together with the heat transfer medium inlet and heat transfer medium outlet in the end area near the burner of the auxiliary heater. The exhaust gas outlet can be routed in a three-dimensionally especially favorable manner out of the auxiliary heater, and optionally, in a connecting block, or a common interface can be combined with the connections of the heat transfer medium circuit.

Especially advantageous throughflow of the heat transfer medium is ensured in accordance with the invention especially when it is made circular in cross section, and the heat transfer medium inlet is diametrically opposite the heat transfer medium outlet. In the heat transfer exchanger, then, there need be only a few means for flow routing so that the heat exchanger, overall, offers relatively little flow resistance for the heat transfer medium to be conveyed by the circulation pump. Therefore, a circulation pump with a correspondingly low pump output can be used. Alternatively, the heat transfer medium inlet and heat transfer medium outlet can also be located on one side, i.e., within a semicircle of the cup of the heat exchanger, which cup is roughly circular in cross section. The flow routing in the heat transfer medium in this case is somewhat more complex. However, the associated disadvantages can also be offset by the corresponding advantages, such as, for example, a connecting block made especially economically for the heat transfer medium inlet and outlet.

The arrangement of the heat transfer medium inlet on the heat exchanger in accordance with the invention is combined especially advantageously with tangential delivery and/or discharge of the flow of heat transfer medium into or out of the heat exchanger. In particular, with tangentially arranged connectors, the three-dimensional circumstances are optimally used, and moreover, flow characteristics which are almost free of backflow and cavitation are formed.

The latter advantages are especially pronounced when the connectors of the heat transfer medium inlet and heat transfer medium outlet extend tangentially relative to the circular cross section such that they are located parallel to one another, and are located especially on one side of the heat exchanger, i.e. as mentioned, that they proceed from at least one semicircle of the heat exchanger which is annular in cross section. Generally, the lengthwise axes of the connectors are advantageously located in a plane which extends perpendicular to the lengthwise axis of the cup-shaped heat exchanger. The connectors configured in this way can be favorably combined in one component and then can be brought into contact with a respective counterpiece.

To further improve the characteristic of the flow of the heat transfer medium, in another embodiment of the invention, the cup-shaped heat exchanger can have an inner cup and an outer cup between which, on the heat transfer medium inlet and heat transfer medium outlet, form a respective collecting space. The collecting spaces can advantageously be made as sections of a ring with an especially essentially round or elliptical cross section in which the heat transfer medium flows essentially uniformly.

The already mentioned means for routing the flow of the heat transfer medium within the heat exchanger as also used fundamentally in heat exchangers of conventional auxiliary heaters, are provided in one advantageous development of the invention, between the inner cup and outer cup of the heat exchanger, and made such that, with them, the flow of the heat transfer medium is also routed to the bottom section of the heat exchanger. Thus, in spite of the unilateral delivery and discharge of the heat transfer medium on only one end area of the heat exchanger in accordance with the invention, the heat-transferring surface of the bottom section of the heat exchanger can be used especially advantageously as a heat transfer surface.

Furthermore, another objective is optimum flow of the heat transfer medium which acts as a coolant there around the inside cup located, on the exhaust gas end, to the sides of heat exchanger. To do this, the indicated means can be made as two bridges which each extend between the inner cup and the outer cup and from the burner end area to the bottom section. The two bridges divide the intermediate space between the inner and outer cup into two half shells through which the heat transfer medium flows in succession. They interrupt the direct connection between the inlet-side and outlet-side collecting spaces over the periphery of the hollow cylindrical wall. Instead, the flow of heat transfer medium is routed through the entire heat transfer medium from the first end section to the bottom section and back from the latter to the first end section. Since, for this flow diversion, only two bridges alone are necessary, especially low flow resistance is ensured. Although, in this type of flow routing flow deflection takes place, it flows almost uniformly around the bottom section to which the largest amount of heat energy is released by the flame of the burner. Almost no backflows or serious turbulence occur. Correspondingly matched cross sectional surfaces of the half shells of the intermediate space and the cross sectional surface of the intermediate space on the bottom section can support this effect.

The two bridges can be made especially economically if they are molded on the inside cup of the heat exchanger. They are then located on the outside of the inner cup which is easily accessible in its production. The bridges are made advantageously such that in the mounted state between them and the outer cup a gap, even if very small, remains. As a result of the remaining gap, the inner cup and the outer cup can be economically produced with more generous dimensional tolerances. This gap need not necessarily be sealed fluid tight. Minor "leakage" between the inlet side and outlet side of the heat exchanger of the invention can be tolerated. The bridges can each be located between two lengthwise ribs on the inside of the outer cup so that, in terms of flow engineering, a labyrinth seal is formed.

In another embodiment of the two bridges for routing the flow of heat transfer medium, the bridges delineate an angle of less than 180° on the side of the heat exchanger facing the heat transfer medium inlet. Thus, the bridges in the intermediate space between the inner and outer cup do not exactly border the two "half shells" but, for example, a "quarter shell" and a "three-quarter shell." The term "half shell" is therefore used in this connection for shells which traverse only roughly a half circle. Delineated angles in the range of 65°/295° to 175°/185°, especially of 130°/230° to 160°/200°, are advantageous. The side of the heat exchanger on which the intermediate space in cross section has a larger angle, for example, 210°, is advantageously the side on which the heat transfer medium outlet is located. In this way, on the side of the heat transfer medium inlet, the flow velocity is increased; this reduces the danger of the accumulation of bubbles (especially in a vertical installation position) and improves venting of the heat exchanger.

In order to advantageously route the heat transfer medium from one "half shell" via the bottom section to the other "half shell," on the bottom section in the intermediate space, a rib can be provided between the inner and outer cup. The rib is made especially advantageously on the inner part, thus, as mentioned above, like the bridges, and extends advantageously in the plane of symmetry of the indicated bridges transversely to them. There can be other, especially arc-shaped, ribs next to the rib. The indicated ribs can extend beyond the bottom section as far as the bordering end area of the cylinder section.

A preferred embodiment of an auxiliary heater in accordance with the invention is explained in detail below using the accompanying drawings.

BRIEF DESCRIPTIONS OF THE INVENTION

DETAILED DESCRIPTION OF THE INVENTION

Figure 1:
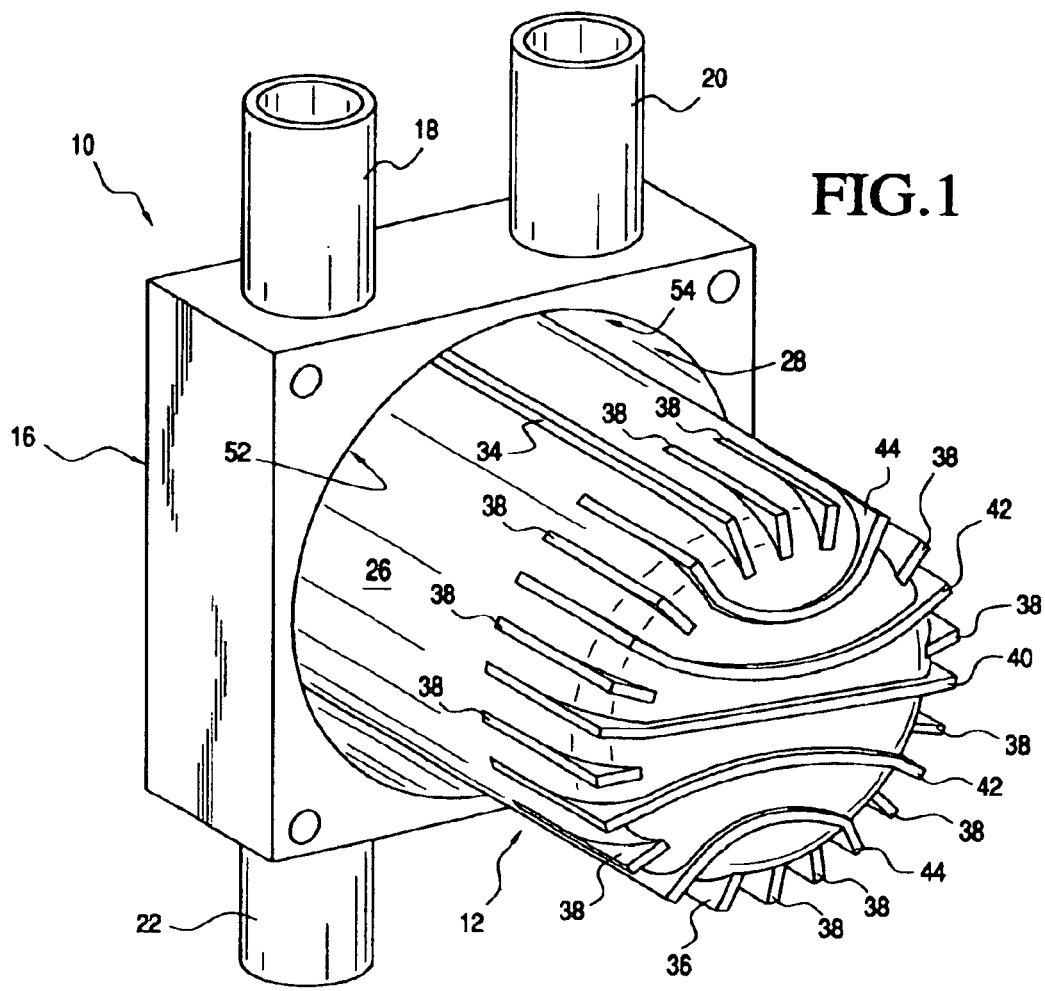
FIG. 1 shows a perspective view of the inner cup of the heat exchanger of the embodiment of the auxiliary heater in accordance with the invention.
Figure 2:
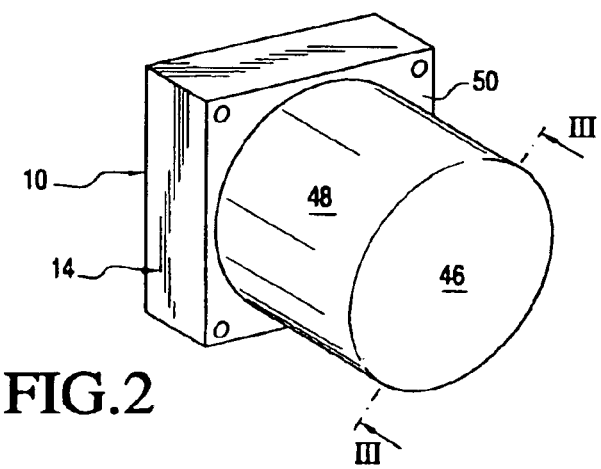
FIG. 2 shows a perspective view of the outer cup of the heat exchanger of the embodiment of the auxiliary heater of the invention on a scale which is reduced compared to FIG. 1.
Figure 3:
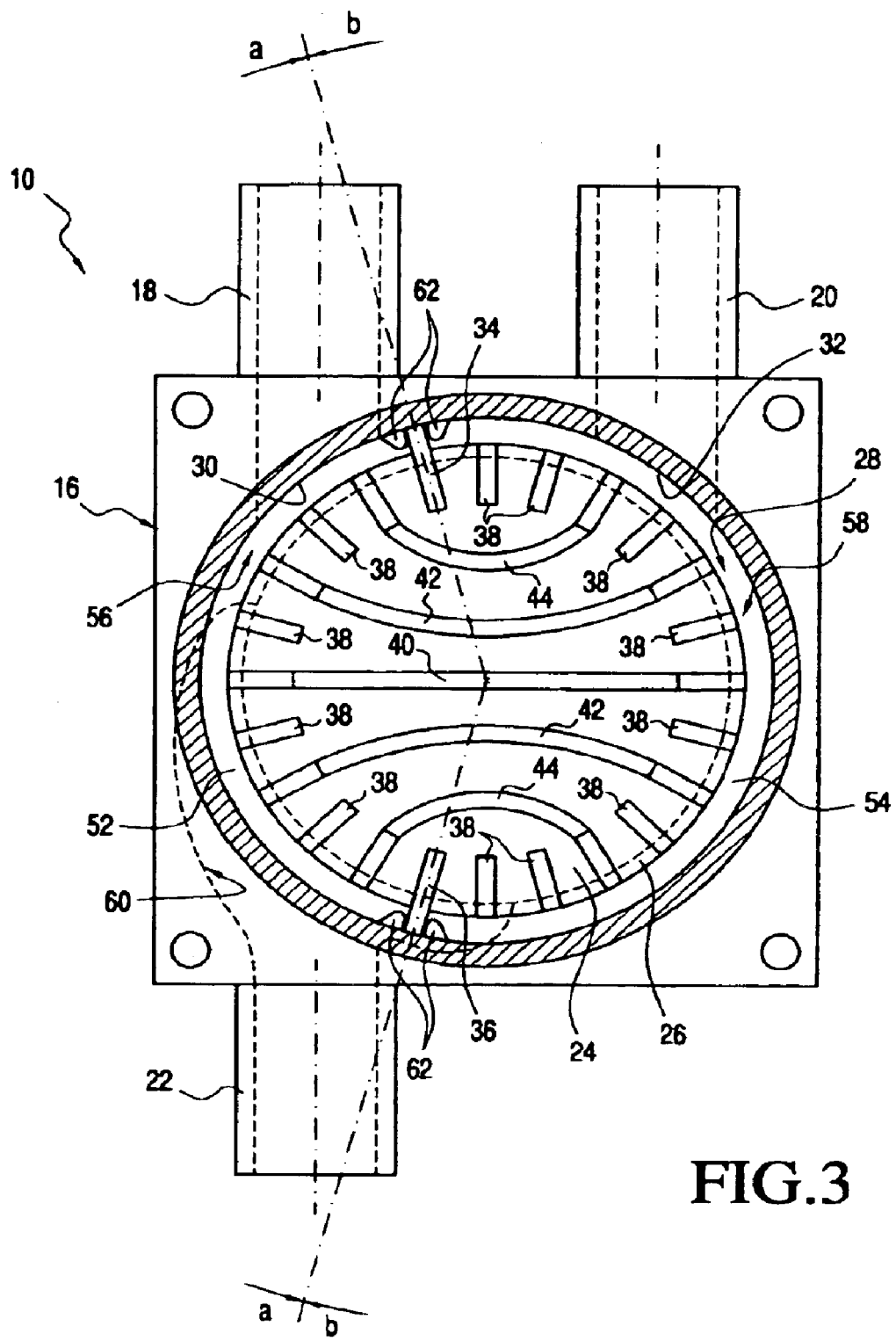
FIG. 3 is a sectional view taken along line III—III in FIG. 2 with a mounted inner cup as shown in FIG. 1.

The essentially cup-shaped heat exchanger 10 shown in FIGS. 1 to 3 has an inner cup 12 which is shown especially in FIG. 1 and an outer cup 14 which is shown especially in FIG. 2. The fire tube of the burner of a fuel-fired heater is received in the inner cup 12 when the heat exchanger is mounted in an auxiliary heater. A flame burning in the fire tube produces radiant heat and heated exhaust gas. The exhaust gas flows from the fire tube into the interior of the inner cup 12, and in doing so, delivers its thermal energy to it. Between the inner cup 12 and the outer cup a fluid heat transfer medium flows, for example, cooling water and/or engine coolant of an internal combustion engine (not shown). The heat transfer medium, for the most part, absorbs the thermal energy which has been transferred to the inner cup 12.

The object is to create heat transfer as efficient as possible between the exhaust gas and the heat transfer medium. Moreover, the heat exchanger 10 must be made compact and economical to produce and maintain.

To devise a heat exchanger 10 in which these objectives are achieved there is a connecting block 16 on the end area of the inner cup 12 facing the burner, on which there is a connector 18 for the heat transfer medium inlet and a connector 20 for the heat transfer medium outlet.

The inner cup 12 comprises a thin-walled, essentially slightly shell-shaped and circular inner cup bottom section 24 which adjoins the inner cup tube or inner cup wall section 26 in the direction of the burner or the connecting block 16. The transition between the inner cup bottom section 24 and the inner cup tube 26 is rounded off. The inner cup tube 26 discharges in a ring-shaped recess 28 in the connecting block 16. The connecting block 16 is penetrated in the middle of the recess 28 by an opening (not shown) and which adjoins the cavity within the inner cup 12. The connecting block 16 is pushed with the open end over the fire tube of the burner when the latter is mounted.

The connectors 18, 20, are provided with a heat transfer medium inlet opening 30 and a heat transfer medium outlet opening 32 from which the connectors 18, 20, discharge into the annular recess 28.

On the outer jacket surface of the inner cup tube 26, two bridges 34, 36 extend in the lengthwise direction of the inner cup tube 26, proceeding from the recess 28 as far as the inner cup bottom section 24. Furthermore, on the inner cup bottom section 24, several ribs 38, 40, 42, 44 are formed; their ends are located distributed regularly over the peripheral edge of the inner cup bottom section 24. These ribs 38, 40, 42, 44 extend over the area of the inner cup tube 26 bordering the inner cup bottom section 24. Of these ribs, ribs 38 proceed from the peripheral edge radially only a short distance over the inner cup bottom section 24, traversing essentially only a rounded area formed on the transition between the inner cup bottom section 24 and the inner cup tube 26. The rib 40 extends essentially diametrically and linearly over the entire inner cup bottom section 24, and lies in the plane of symmetry of the two bridges 34 and 36; this is especially apparent in FIG. 3.

Between the ribs 38 which are made next to the bridges 34 and 36 and the rib 40, there are two ribs 42, 44 which are arc-shaped and extend from one side of the inner cup tube 26 to the opposite side. The radius of curvature of the ribs 42 is greater than that of the ribs 44. At the ends of the ribs 40, 42, 44, a respective rib 38 extends between them. However, there can also be more than two of these arc-shaped ribs 42 and 44 per half shell.

The outer cup 14 of the cup-shaped heat exchanger 10 has an outer cup bottom section 46 adjoining the outer cup tube 48. The outer cup bottom section 46 is circular and arches only slightly to the outside in the shape of a shell or key. The outer cup tube 48 adjoins the flange 50 which is adapted for attachment to the connecting block 16 on the end facing away from the outer cup bottom section 48.

Attachment of the flange 50 to the connecting block 16 takes place by pushing the outer cup tube 48 of the outer cup 14 over the inner cup bottom section 24 and the inner cup tube 26. In doing so, the flange 50 comes to rest against the connecting block 16 and can be attached to it by screws via the unnumber holes shown in each of the corners of block 16 and flange 50. Between the inner cup 12 and the outer cup 14, a cavity is formed through which the heat transfer medium can flow. This cavity can be easily sealed by inserting a seal, for example, an O-ring seal, between the flange 50 and the connecting block 16.

The operation especially of the aforementioned connecting block 16, the bridges 34, 36, and also the ribs 38 to 44 is explained in further detail below.

All the connections for feed lines and discharge lines on the heat exchanger 10 are combined in one component with the connecting block 16. This component can be optimally matched according to its function with respect to material selection, construction configuration and production. Furthermore, the combined connection simplifies installation in the pertinent auxiliary heater.

The heat transfer medium inlet 18 is located on the connecting block 16, and therefore, on the end area of the heat exchanger 10 facing the burner. This is in contrast to the conventional arrangement of a heat transfer medium inlet on the bottom section of the heat exchanger. In this way, the heat transfer medium flows uniformly around the bottom section which is heated by the flame of the burner in the heat exchanger 10.

The bridges 34, 36, after installation, divide the cavity formed between the outer cup 14 and the inner cup 12 into two roughly half shell-shaped cavity sections 52, 54. The cavity section 52 is located on the side of the heat transfer medium inlet 18, the cavity section 54 on the side of the heat transfer medium outlet 20. The entering fluid heat transfer medium flows first into the cavity section 52, from the latter due to the deflection by the bridges 34 and 36 beyond the inner cup bottom section 24 and only then through the cavity section 54. The heat transfer medium thus flow uniformly around the heat exchanger over the entire surface of the inner cup 12.

On the inside of the outer cup 14, there are two pairs of lengthwise ribs 62, each pair being assigned to a respective one of the two bridges 34, 36 so that each of the bridges 34, 36 is located between the respective pair of lengthwise ribs 62 which, in flow engineering terms, form a labyrinth seal when the inner cup 12 is axially inserted into the outer cup 14.

In the recess 28, at the mouth of the inlet opening 30 and the outlet opening 32, due to the deflection of the flow of the heat transfer medium there, the danger of backflow and dead water areas is especially high. In this area, the recess 28 easily forms part of the partially annular channels 56, 58 and serves as a collecting space in which turbulence decays and pressure fluctuations can be equalized.

The connectors 18, 20 of the heat transfer medium inlet and outlet extend tangentially to these parts of the partially annular channels 56, 58 so that the flow of heat transfer medium is deflected, overall, only comparatively little. In addition, the two connectors 18, 20 are located close enough to one another and are directed in the same direction so that they can therefore make contact with a corresponding connecting piece in an economical and space-saving manner.

Furthermore, a collecting space 60 is formed in the connecting block 16 in the area of the exhaust gas outlet 22.

The cavity sections 52, 54 bordered by the bridges 34, 36 are not shaped exactly like a half shell. The bridges 34, 36 are not located oppositely on the inner cup 12, but slightly diametrically offset. On the side of the heat transfer medium inlet 18, they delineate an angle a of 150° on the periphery of the inner cup 12 and on the side of the heat transfer medium outlet 20 an angle b of 210°. Therefore, the cavity section 52 on the inlet side of the heat transfer medium in the cross section shown in FIG. 3 is smaller than the cavity section 54 on the outlet side. In this way, the flow velocity of the heat transfer medium is increased on the inlet side, and thus, the danger of bubble formation or cavitation, especially with a vertical installation position, is reduced.

The ribs 38, 40, 42, 44 deflect the flow of the heat transfer medium, at the transition between the inner cup bottom section 24 and inner cup tube 26, from the jacket surfaces of the inner cup 12 and outer cup 14 over its bottom section surfaces. Thus, dead water areas on the bottom section of the heat exchanger 10 are avoided.

What is claimed is:

1. Heat exchanger of an auxiliary heater which includes an auxiliary burner for mobile applications, comprising:
   inner and outer annularly assembled cups, each cup having a hollow cylindrical wall section having an open end area that is mountable over the burner of the auxiliary heater, and a closed bottom end section attached to the hollow cylindrical wall section at an opposite end from said open end area, wherein a flow path for a flow of a fluid heat transfer medium is formed by an annular space between the assembled cups
   a heat transfer medium inlet for feeding the flow of fluid heat transfer medium into the flow path,
   a heat transfer medium outlet for withdrawing the flow of the fluid heat transfer medium from the flow path; and
   a heat transfer medium directing means positioned in the annular space between the hollow cylindrical wall sections which defines an inlet-side heat transfer medium flow path and an outlet-side heat transfer medium flow path between which the heat transfer medium flows via the annular space formed between the closed end sections of the inner and outer cups, and
   wherein both the heat transfer medium inlet and the heat transfer medium outlet are located adjacent to the open end of the heat exchanger and are in fluid flow connection with the inlet-side and outlet-side heat transfer medium flow paths, respectively.

2. Heat exchanger as claimed in claim 1, further comprising an exhaust gas outlet, wherein said exhaust gas outlet is located adjacent to the open end area and in fluid communication with the interior of the inner cup.

3. Heat exchanger as claimed in claim 2, wherein the cylindrical wall sections have a ring-shaped cross section, and wherein the heat transfer medium inlet and the heat transfer medium outlet are diametrically spaced along sides of the annular space.

4. Heat exchanger as claimed in claim 2, wherein the cylindrical wall sections have a ring-shaped cross section,
   wherein the heat transfer medium inlet and heat transfer medium outlet each form a connector, and
   wherein at least one of the connectors extends in a generally tangential direction relative to the ring-shaped cross section.

5. Heat exchanger as claimed in claim 4, wherein both of the connectors extend in a generally tangential direction relative to the ring-shaped cross section and are parallel to one another.

6. Heat exchanger as claimed in claim 1, wherein the heat transfer medium directing means is formed on the hollow cylindrical wall of the inner cup.

7. Heat exchanger as claimed in claim 6, further comprising at least one rib on the closed end of the bottom section that guides the flow of heat transfer medium from one side of the heat exchanger to an opposite side.

8. Heat exchanger as claimed in claim 6, wherein said at least one rib on the closed end of the bottom section comprises a plurality of ribs, at least some of which are curved.

9. Heat exchanger as claimed in claim 6, wherein the directing means comprises two bridges, each extending on one of the inner cup and the outer cup toward the other of the inner cup and the outer cup, and from the open end area to the closed end.

10. Heat exchanger as claimed in claim 9, wherein the two bridges are formed on the inner cup of the heat exchanger.

11. Heat exchanger as claimed in claim 9, wherein the two bridges each are positioned between two lengthwise ribs which are located on the other of the inner cup and the outer cup and wherein the bridges and ribs together form a labyrinth seal.

12. Heat exchanger as claimed in claim 11, wherein the two bridges are arranged at an angle of less than 180° on a side of the beat exchanger at which the heat transfer medium inlet is located.

13. Heat exchanger as claimed in claim 1, wherein a connector block having inlet and outlet connectors, is mounted on the open end area of the inner cup, and a mounting flange is mounted on the open end area of the outer cup, the mounting flange being attached to the connector block.

14. Heat exchanger as claimed in claim 1, wherein the cylindrical wall section has inner and outer walls of ring-shaped cross section, and wherein the heat transfer medium inlet and the heat transfer medium outlet are diametrically spaced along sides of the annular space.

15. Heat exchanger as claimed in claim 1, wherein the cylindrical wall sections have a ring-shaped cross section, and wherein the heat transfer medium inlet and heat transfer medium outlet each form a connector, and wherein at least one of the connectors extends in a generally tangential direction relative to the ring-shaped cross section.

16. Heat exchanger as claimed in claim 15, wherein both of the connectors extend in a generally tangential direction relative to the ring-shaped cross section and are parallel to one another.

* * * * *